United States Patent

Weimer

[15] 3,676,590

[45] July 11, 1972

[54] DECODERS AND COUPLING CIRCUITS FOR SOLID STATE VIDEO PICKUP

[72] Inventor: Paul Kessler Weimer, Princeton, N.J.

[73] Assignee: RCA Corporation

[22] Filed: Sept. 25, 1970

[21] Appl. No.: 75,553

[52] U.S. Cl. .........................178/7.1, 250/211 R, 340/166 R

[51] Int. Cl. .........................H04n 5/30

[58] Field of Search .....................178/7.1; 250/211 R, 211 J; 307/311; 340/166 R; 315/169 TV

[56] References Cited

UNITED STATES PATENTS

| | | | |
|---|---|---|---|
| 3,562,418 | 2/1971 | Glusick et al. | 178/6 |
| 3,435,138 | 3/1969 | Borkan | 178/7.1 |
| 3,445,589 | 5/1969 | Taylor | 178/7.1 |
| 3,011,089 | 11/1961 | Reynolds | 250/211 J |
| 3,196,405 | 7/1965 | Gunn | 340/166 R X |
| 3,427,461 | 2/1969 | Weckler | 250/211 J |
| 3,488,508 | 1/1970 | Weimer | 250/211 R X |
| 3,537,071 | 10/1970 | Weimer | 340/166 R |

*Primary Examiner*—Robert L. Richardson
*Attorney*—H. Christoffersen

[57] ABSTRACT

Circuit means for storing charge produced by elements of a matrix array and for producing an output signal indicative of the amount of charge stored. In two of the circuits illustrated, each column of the array is coupled to the base of a transistor and to one terminal of a charge storage means and two valued sampling pulses are applied between the emitter of the transistor and the other terminal of the charge storage means. For one value of the sampling pulse the transistor is reversed biased and charge generated by one of said elements is accumulated on said charge storage means. For the other value of the sampling pulse, the transistor is forward biased for reading out the charge stored on said means and concurrently removing the accumulated charge on said storage means. In another of the circuits a pair of diodes are employed at each column rather than a transistor.

14 Claims, 6 Drawing Figures

INVENTOR.
PAUL K. WEIMER
BY H. Christoffersen
Attorney

TRANSISTOR-CAPACITOR VIDEO COUPLER

INVENTOR.
PAUL K. WEIMER
BY H. Christoffersen
Attorney

INVENTOR.
PAUL K. WEIMER
BY H. Christoffersen
Attorney

DECODERS AND COUPLING CIRCUITS FOR SOLID STATE VIDEO PICKUP

Embodiments of the invention shown in FIG. 5 where made in the course of or under a contract or subcontract thereunder with the Department of the Air Force.

BACKGROUND OF THE INVENTION

Sampling the elements of a matrix array of sensing elements so as to optimize the signal obtained from the elements is a primary goal of the scanning circuitry associated with the array. Associated with matrix arrays of elements such as image sensors are video couplers for separating out the video signal when the array is scanned. Known video couplers consist, for example, of a row of transistors operating as switches which couple the rows (or the columns) of the array to a common output bus.

Getting a useful video signal with the known schemes poses a serious problem since the signal is generally small and associated with the signal are switching transients of much greater amplitude than the signal. An object of this invention is to provide improved means for coupling a signal such as a video signal produced by elements of an array to an external circuit.

SUMMARY OF THE INVENTION

A charge storage means and a coupling means for producing an output signal proportional to the stored charge are connected in common at one end to a sensing element which produces a current in response to an excitation signal. Scan means are coupled between the other ends of said charge storage means and said coupling means for during one time interval rendering the coupling means non-conducting and storing on said storage means the charge generated by said sensing element and for during a second succeeding time interval rendering the coupling means conducting for producing an output signal and concurrently discharging said charge storage means.

BRIEF DESCRIPTION OF THE DRAWINGS

In the accompanying drawings, like reference characters denote like components, and.

DETAILED DESCRIPTION

Figure 1:
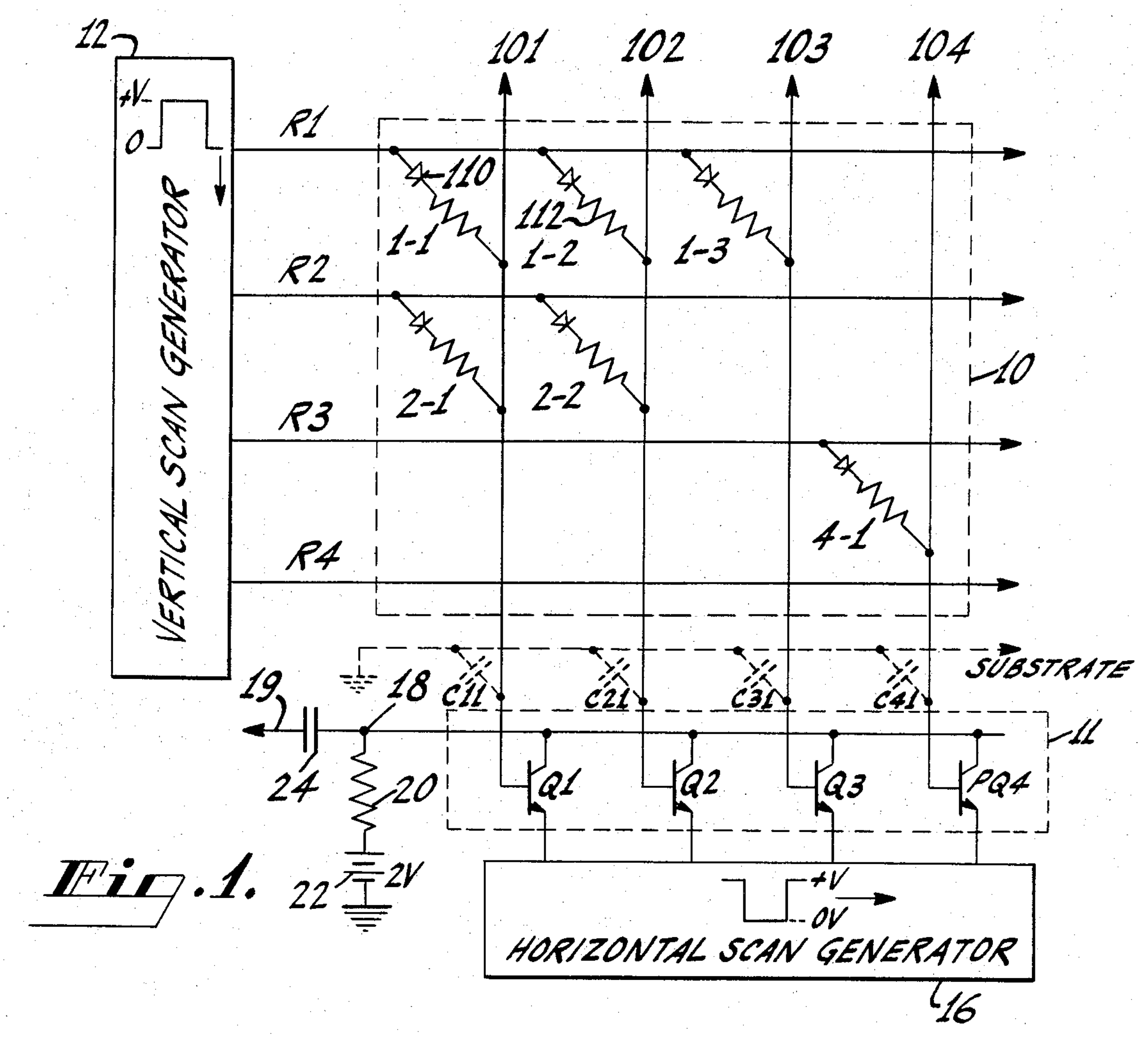
FIG. 1 is a schematic drawing of a circuit embodying the invention which includes a video coupler employing bipolar transistors.

The circuit of FIG. 1 includes a matrix array 10 of photoresponsive elements (1—1, 1-2, . . . 4-1) arranged in rows and columns. For ease of illustration, the array 10 is shown having four horizontal conductors which, for ease of reference, are called rows (R1, R2, R3, R4) and four vertical conductors intersecting the horizontal conductors and which, for ease of reference, are called columns (101, 102, 103, 104). It should be evident that the array could have N rows and M columns where N and M are integers greater than 1, and where M and N may be substantially greater than 4.

Each photoresponsive element includes a diode in series with a photoconductive element. This is illustrated, for example, by element 1—1 comprising a diode 110 having its anode connected to row R1 and its cathode connected to one end of photoconductive element 112 whose other end is connected to column 101. The impedance of the photoconductive element ($R_{PC}$) with no incident light is of the order of 100 to 200 Megohms. Therefore with no light incident on the element and even with a considerable operating potential applied across it, substantially no current flows through the element. On the other hand, with light impinging on it, the impedance of the photoconductive element decreases and a current proportional to the incident light flows when a potential is applied across it. It should be noted that, though the invention is illustrated using photoconductive transducing elements, any other transducer which produces a current in response to an excitation signal may be used in circuitry embodying the invention.

The video coupler 11 couples the horizontal scan generator 16 to the columns of the array 10, while the vertical scan generator 12 is directly connected to the rows of the array 10. Scan generators 12 and 16 may be any one of a well known number of scan generators which produce sequentially spaced pulse on its output lines which may then be coupled to the address strips of a matrix array in order to sample the elements thereof. The video coupler 11 is comprised of one stage per column, each stage including a single transistor. Each transistor (Q1, Q2, Q3, Q4) has its base connected to a different one of the columns, its emitter connected to a different one of the output terminals of horizontal scan generator 16 and its collector connected to the collectors of the other transistors and to junction point 18. The latter is returned through load resistor 20 to a source of operating potential 22 having a magnitude greater than V volts (in the embodiment of FIG. 1 the selected value was 2V volts). Coupling capacitor 24 is connected at one end to junction point 18 and at the other end to output line 19 which in turn may be connected to an amplifier (not shown).

Associated with each column is a capacitance shown by dashed lines and labelled respectively C11, C21, C31 and C41. This capacitance may be the distributive capacitance associated with the column and/or additional discrete capacitance connected to the columns to increase the charge storage capacity. The capacitance serves as a charge storage means for developing a signal potential which is the integral of the photo current which flows during the time the vertical scan pulse is applied.

Figure 2:
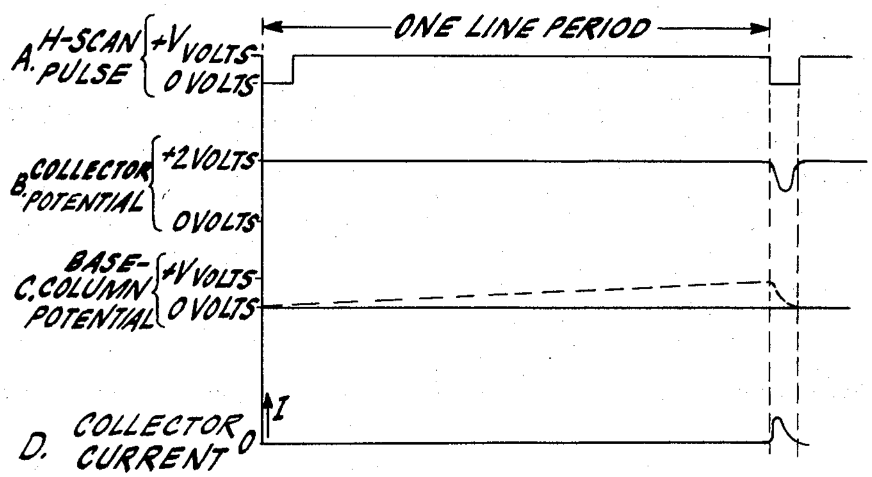
FIG. 2 is a drawing of some of the waveforms associated with the circuit of FIG. 1.

The operation of the circuit is best understood by referring to FIG. 2 which shows some of the wave shapes associated with the circuit of FIG. 1. A horizontal scan (H-scan) pulse which is normally at +V volts and which is switched to zero volts when the column is to be sampled is sequentially applied to the emitters of the video coupler transistors (Q1, Q2, Q3, Q4). That is, for example, after the negative going pulse applied to the emitter of transistor $Q_1$ returns to +V a negative going pulse is then applied to the emitter of transistor $Q_2$. After its return to +V, the negative pulse is applied to the emitter of transistor $Q_3$ and so on until all the emitters of the video coupler have been sampled. A positive going (zero to +V volts) vertical scan (V-scan) pulse as shown in FIG. 1 is sequentially applied to the rows for one line time. That is, the V-scan pulse is applied to one row until all the columns are sampled then it is applied to the next row and so on until all the rows have been energized. Any one of the video coupling transistors having an H-scan pulse of +V volts amplitude applied to its emitter is reverse biased and is rendered non-conducting. The maximum potential applied to the base of any of the video coupling transistors is +V volts (from vertical scan generator 12 through an element of the array). Therefore, when the emitter potential of a transistor is +V volts the base-to-emitter junction of the video coupling transistor is reverse biased and the transistor is non-conducting. This allows the accumulation and storage of charge in the base circuit of the reverse biased video coupling transistors.

Since the operation of each stage is identical, only a detailed description of one stage (stage 2) arbitrarily selected is given.

Assume, for example, that as shown in FIg. 1, a positive V-scan pulse is applied to row R2 and that the H-scan pulse applied to the emitter of transistor Q2 is also at +V volts. Assume also that there is some incident light on element 2—2 rendering said element conductive. Under this condition, a current proportional to the incident light intensity flows from row R2 through array element 2—2 and into the base of transistor Q2. Since transistor Q2 is reverse biased, this signal current ($i_s$) charges capacitor C21 developing a potential ($V_S$) across it which, as shown in waveform C of FIG. 2, causes the base-column 102 potential to rise. (The value of the signal potential is $V_S=1/C\int i_s\,dt$.) The potential across capacitor C21 may rise to a value of +V volts but for this value of base potential, the video coupling transistors are still non-conducting so long as +V volts is applied at their emitters.

When the potential at the emitter of Q2 is switched from +V volts to zero volts, two things happen: 1) The charge accumulated on the base of transistor Q2 causes a current ($i_b$) to flow through the base-to-emitter region of transistor Q2. The base current ($i_b$) is multiplied by the forward current gain ($\beta$) of transistor Q2 generating an amplified current ($\beta x i_b$), waveform D FIG. 2, through the collector-to-emitter path of transistor Q2. This amplified current flows through the AC load impedance comprising the parallel paths of load impedance 20 and the input impedance of a video amplifier, if any, (not shown) connected to output line 19. The output signal (i.e., the collector current) is thus $\beta$ times greater than in prior art circuits. Note that if the load impedance is made relatively small there is only a small change in the collector potential. However, with a higher load impedance the voltage at the collector of the transistors varies as per waveform B of FIG. 2. 2) The base-to-emitter diode of coupling transistor Q2 discharges the charge accumulated on capacitance C21. A residual potential may exist across capacitor C21 since transistor Q2 stops conducting when the potential across its base-to-emitter region drops below the $V_{BE}$ threshold. Thus, when the H-scan pulse is at zero volts, a residual potential of $V_{BE}$ volts will exist across C21. However, this does not pose a serious problem since this is a constant DC offset which may be neglected. Alternatively, the horizontal scan generator may be designed to provide pulses which are one $V_{BE}$ drop below ground potential.

Though the video coupler is shown coupled to the columns, it should be evident that here as well as in the subsequent figures it could just as well be connected to the rows. In either case the circuit has the important advantage that it both samples the elements of the array and concurrently provides current gain for the signals produced by the elements of the array.

Figure 3:
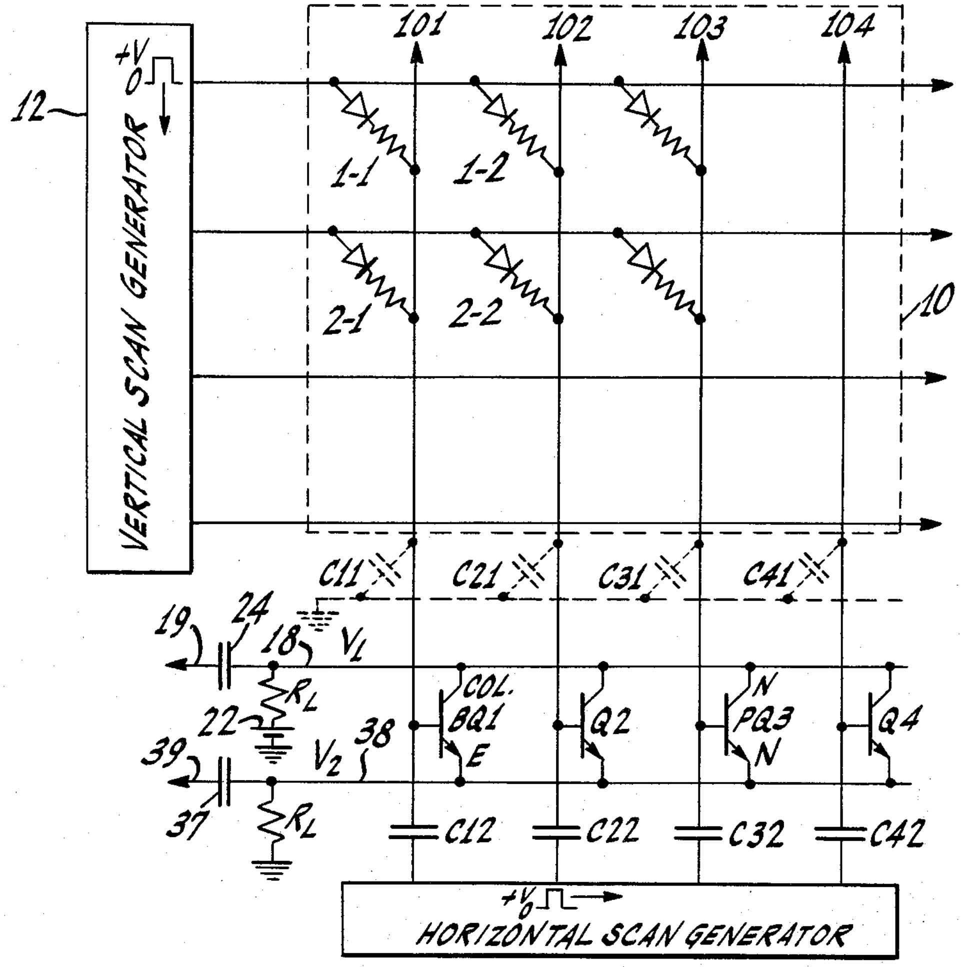
FIG. 3 is a schematic drawing of another embodiment of the invention employing bipolar transistors.

In the circuit of FIG. 3 the columns 101, 102, 103 and 104 of array 10, which may be of the same type as that shown in FIG. 1, are respectively coupled to horizontal scan generator 40 by means of coupling capacitors C12, C22, C32 and C42. The coupling capacitors (C12, C22, C32, C42) are made larger than the shunt and column capacitance (C11, C21, C31, C41) and predominate in the determination of the time constants. As described below, while the coupling and shunt capacitors are operated in parallel during the charging cycle they operate as a voltage divider when the H-scan pulse is applied to the coupling capacitors. The potential developed at the base of a coupling transistor being a function of the coupling capacitor divided by the sum of the coupling capacitor and the shunt capacitance (e.g., C12/C12+C11). By proper choice of the amplitude of the H-scan pulse and/or by properly selecting the ratio of the capacitance the desired amplitude pulse is applied to the bases of the coupling transistors. As in FIG. 1, the rows of array 10 are sequentially energized by a vertical scan generator 12; and, each video coupling transistor (Q1,...Q4) has its base connected to a different one of the columns and its collector connected in common with the collectors of the other transistors to form a first video output ($V_1$) at junction point 18. The latter is coupled to output line 19 by means of coupling capacitor 24 and to a source of operating potential 22 by means of load resistor 20. In addition, the emitters of the video coupling transistors (Q1,...Q4) are connected in common to form a second video output ($V_2$) at junction point 38 which is coupled through capacitor 37 to output line 39 and through load resistor 26 to ground. By making the load impedance (which includes the load resistor as well as any impedance connected to the output terminal) at junction point 18 equal to that at junction point 38 the amplitude of the signal generated at the collectors (junction point 18) and at the emitters (junction point 38) is substantially equal since the emitter current is approximately equal to the collector current for reasonable values of transistor current gain. The video signals generated at junction points 18 and 38 are of substantially equal amplitude but of opposite phase, while the switching transients produced at the two outputs (since they are predominantly AC coupled) have the same polarity. The switching transients are of the same polarity because the rising and falling edges of the sampling pulses applied to the bases of the coupling transistors are coupled by the base-to-collector capacitance and by the base-to-emitter capacitance to junction points 18 and 38 respectively. Thus by subtracting the $V_2$ signal from the $V_1$ signal a significant improvement in the ratio of signal-to-switching transients may be obtained since the transients are cancelled and the already amplified signal may be doubled.

The horizontal scan generator 40 which serves to sequentially pulse the coupling capacitors (C12,...C42) may be of the same general type as the generator 16 of FIG. 1 but must in this circuit provide positive-going scanning pulses since the bases of the video coupling transistors are being driven instead of the emitters.

Figure 4:
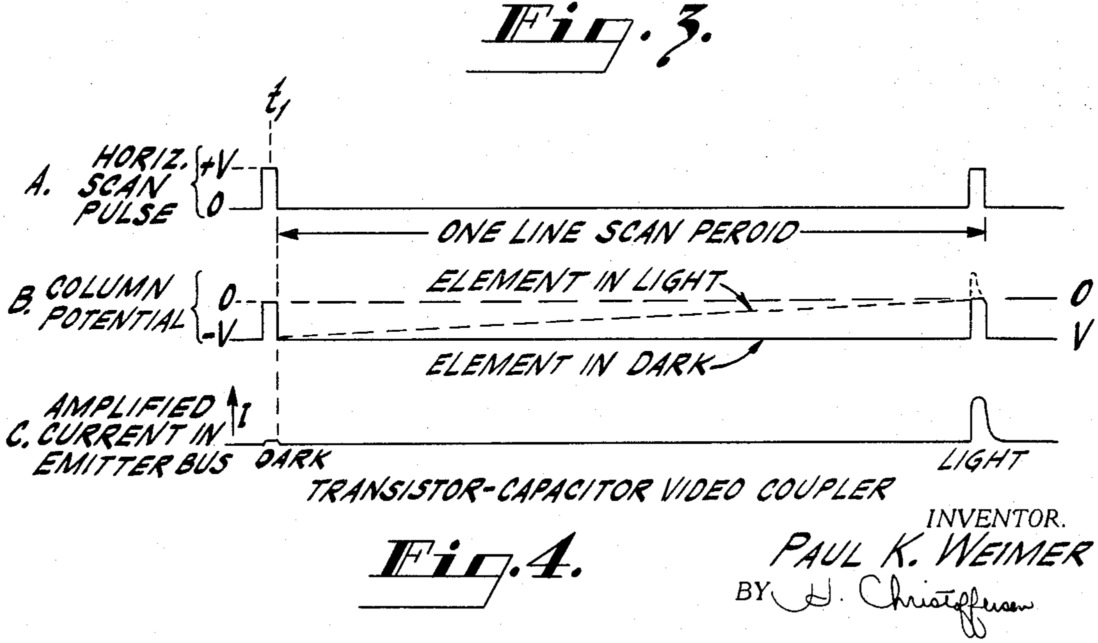
FIG. 4 is a drawing of some of the waveforms associated with FIG. 3.

The operation of each stage (column sampled) is identical to that of any other stage and as was the case for the circuit of FIG. 1, the operation of the second stage is arbitrarily selected for detailed description. Assume that the base of transistor Q2 is at or near ground potential and that the horizontal scan (H-scan) pulse makes a transition from +V volts to zero volts (a negative step of V volts amplitude). In response to this negative-going voltage step, the potential at the base of transistor Q2 (column 102) goes from zero volts to −V volts since the voltage across a capacitor cannot change instantaneously. The voltage level at the base of transistor Q2 is therefore −V volts with respect to the potential at its emitter as depicted by the potential at time $t_l$ of waveform B of FIG. 4. Transistor Q2 is thus reverse biased and rendered non-conductive until its base potential increases to one $V_{BE}$ drop above its emitter potential.

With a vertical scan (V-scan) pulse of a +V volts amplitude applied to row R2 and with light incident on element 2—2 of the array, current will flow charging capacitors C21 and C22. Both capacitors charge because they are effectively in parallel when the H-scan pulse is at zero volts since both are connected at one terminal to column 102 and at the other terminal to substantially ground potential. The signal potential being developed across capacitors C21 and C22 adds algebraically to the reverse bias of −V volts induced on the column by the negative-going transition of the H-scan pulse. But, until a signal potential of sufficient amplitude to completely cancel the negative bias is developed across the capacitors, transistor Q2 remains non-conducting.

A disadvantage of the FIG. 3 circuit as compared to that of FIG. 1 is that the potential at the base of Q2 may, depending on the light intensity, the sensitivity of element 2—2, and the line scan period, rise until the base potential exceeds the emitter potential (by one $V_{BE}$ drop) at which time the transistor would go into steady state conduction. Knowledge of the maximum incident light intensity and the sensitivity of the elements of the array is used to determine the maximum period between scan pulses before the voltage level at the bases of transistor Q2 turns the device on. It may therefore safely be assumed that the light level will be limited so that the column will always be scanned before the potential across the charge storage means--capacitors C21 and C22--exceeds the emitter potential.

When the H-scan pulse makes a positive going transition from zero volts to +V volts, a positive step of V volts amplitude is coupled through capacitor C22 to the base of transistor Q2. This positive voltage step may be viewed as a pedestal which raises the level of the stored signal by V volts. The positive voltage step thus acts to cancel the negative voltage step applied earlier, returning to a net of zero volts that portion of the base voltage of transistor Q2 due to the sampling H-scan pulse. The base of transistor Q2 is thus forward biased with respect to its emitter by a voltage whose amplitude and energy content is a direct function of the charge stored on the capacitor C22 (and C21) during the previous line scan interval. The stored charge is, in turn, directly proportional to the current which flowed through element 2—2 whose impedance change was directly proportional to the light intensity.

With the application of the positive step, base current ($i_b$) flows through the base-to-emitter region of transistor Q2 and, as above, this current is multiplied by the forward current gain ($\beta$) of the transistor causing a collector current ($i_c$) which is $\beta x i_b$ and an emitter current $i_e$ which is $(\beta+1)i_b$. An in-phase video signal (with respect to the base potential) is generated at the emitter and an out-of-phase video signal at the collector. The two currents ($i_c$ and $i_e$) for reasonable values of $\beta$ (10 or greater) are substantially equal and the two output signals produced by the currents may, as mentioned earlier, be made substantially equal by the proper adjustment of load resistors 20 and 26.

Present at the junction points 18 and 38 are the switching transients which occur in part due to the capacitive coupling of the signal applied at the base by the base-to-collector and base-to-emitter capacitances of the transistors sampled. The switching transients are thus normally in-phase. By subtracting the $V_2$ signal from the $V_1$ signal (or vice-versa) by, for example, feeding $V_1$ and $V_2$ to a differential amplifier (not shown) the switching transient may be virtually eliminated while the signal is further enhanced.

The circuit of FIG. 3 thus has the advantage that the scanning signals drive the base of the video coupling transistors which generally require less power from the driving source. Furthermore, the circuit also provides an amplified signal ($V_1$) and its complement ($V_2$) with each signal containing transient signals in a form which enables the cancelling of the transient signal.

The circuits of FIGS. 1 and 3 represent an important reduction in the complexity of the circuits required to drive a matrix array of the type shown in the figures. In addition, as the collectors of the video couplers are connected to a common line they can be easily integrated by planar silicon techniques. In addition, the circuit as already mentioned provides a sizeable increase in signal output level and in the sensitivity of the sensor.

Figure 5:
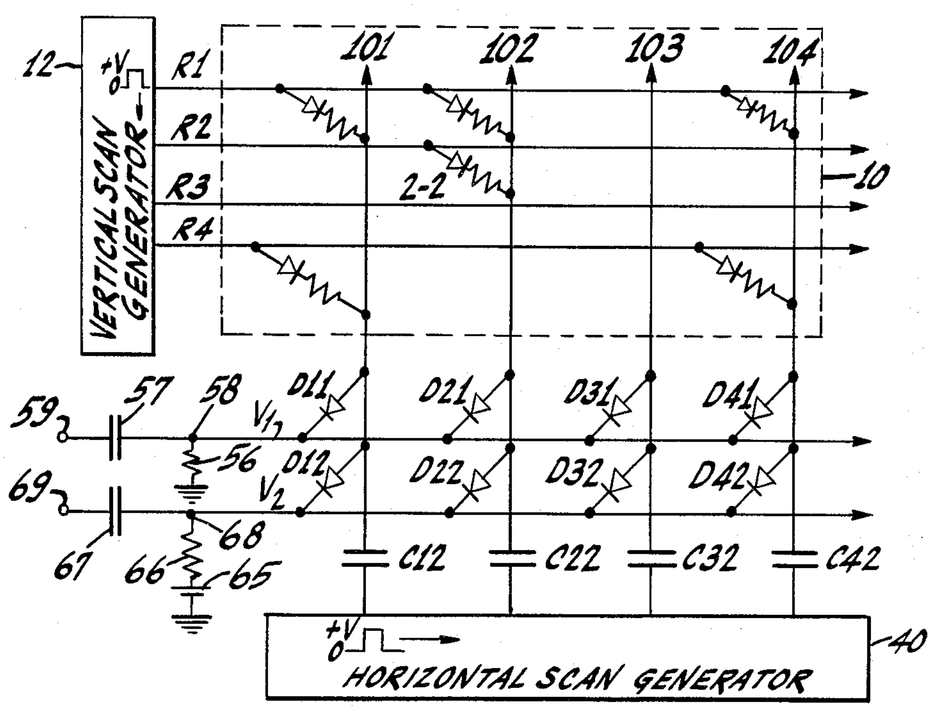
FIG. 5 is a schematic drawing of a circuit embodying the invention which includes a video coupler employing diodes and capacitors.

The circuit of FIG. 5 illustrates the use of diodes and capacitors to perform the storage and sampling of the information generated by the elements of matrix array 10. In this circuit associated with each column are two diodes with their anodes connected to their respective columns. The first set of diodes (D11, D21, D31, D41) have their cathodes connected in common to form a first video output ($V_1$) at junction point 58 which is returned through load resistor 56 to ground potential. The video information as well as the switching transients appearing at junction point 58 are coupled by means of capacitor 57 to an output terminal 59, which may, in turn, be connected to external circuitry (not shown) such as an amplifier.

The second set of diodes (D12, D22, D32, D42) have their cathodes connected in common to form a second video output ($V_2$) at junction point 68 which is returned through load resistor 66 to a source of operating potential 65. The latter is selected to have a magnitude sufficient to block the passage of video signals while allowing the passage of switching transients generated by the sampling pulses. The transient signals appearing at junction point 68 are coupled by means of capacitor 67 to an output terminal 69 which may be connected to an external amplifier (not shown). As in FIG. 3, columns 101, 102, 103 and 104 are respectively coupled by capacitors C12, C22, C32 and C42 to horizontal scan generator 40 which may be of the same type as the one shown in FIG. 3. The rows of the array, as before, are sequentially scanned by a vertical scan generator 12.

Figure 6:
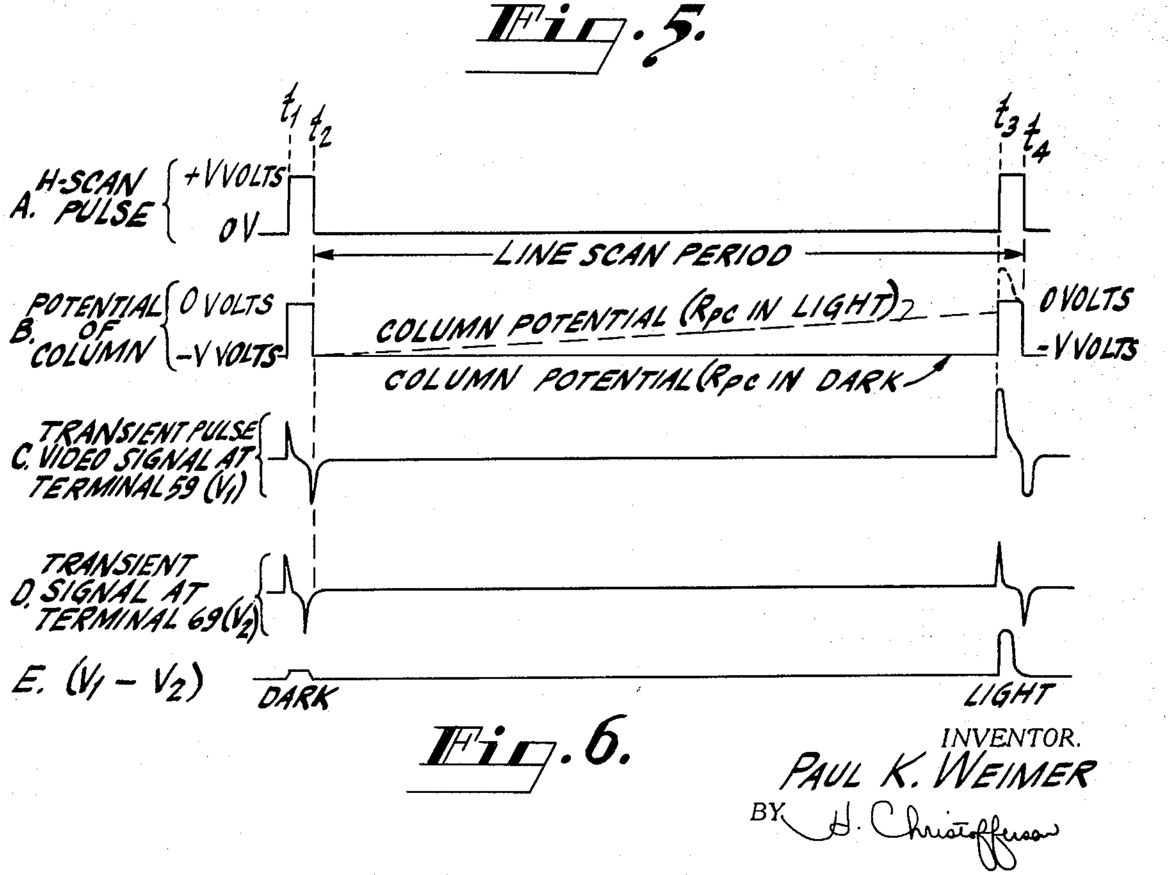
FIG. 6 is a drawing of some of the waveforms associated with the circuit of FIG. 5.

The operation of the array is best understood by referring to the waveforms of FIG. 6 and recalling that, as in FIG. 3, when the H-scan pulse which is applied to one of the coupling capacitors (C12,...C42) makes a negative-going transition from +V volts to zero volts, the negative-going step is coupled to the column. The potential of the column as shown in waveform B of FIG. 6 goes from zero volts to −V volts at time $t_2$ which reverse biases the video coupling diodes and renders them non-conducting. As shown in waveform B, the potential across the capacitor associated with a column increases if there is incident light falling on the array. With no incident light, the potential of the column remains at −V volts.

Since the operation of each stage (column) is identical to the others, only stage number 2 is, again, arbitrarily selected for detailed description. Beginning at time $t_2$ in waveforms A and B of FIG. 6 it may be noted that at the end of the scan pulse the (column 102) potential is driven negative (−V volts) with respect to ground and the coupling diodes (D21, D22) are reverse biased and thereby rendered non-conducting.

Assuming light to be impinging on the photoconductive element (2-2) and that row R2 is positively biased, current will flow from the row through the element and into the capacitor (C22) charging up the capacitor (C22) and causing the column potential to gradually lose its negative charge by an amount proportional to the incident light intensity.

When at time $t_3$ in FIG. 6 the H-scan pulse applied to capacitor C22 makes a positive-going transition from zero volts to +V volts, the positive-going step cancels the effect of the negative step applied earlier at time $t_2$. The total charge, if any, accumulated across the capacitor C22 during the line scan interval ($t_2$ to $t_3$) causes the column potential to go positive (see waveform B, FIG. 6) and a pulse of current now flows through the diode D21 and into load resistor 56 and through coupling capacitor 57 to output terminal 59.

If ideal components were employed, a single row of diodes would be sufficient to perform the desired signal coupling function. However, associated with each diode and with the rows and columns of the matrix is some capacitance which couples the edges of the sampling pulse onto the output terminals. These capacitances act as low impedance paths to the fast rising and falling edges of the sampling pulses and as a result switching transients of considerable amplitude are coupled to the output. As a matter of fact, the amplitude of the switching transient may be such as to totally mask the signal. To enable the effective cancellation of the switching transients, the second row of diodes (D12, D22, D32, D42) is provided. By applying a bias at junction point 68 so that its steady state potential is always more positive the most positive video signal obtained, the video signal will be prevented from passing through the second set of diodes. However, the high frequency and high amplitude switching transient signals will pass through the diode and capacitor 67 and appear at output terminal 69. Note that by making capacitor 67 large, it will eventually charge up to the most positive video signal and thus automatically provide the necessary video signal blocking potential. The signal $V_2$ containing the transient information may then be subtracted by means of comparator circuitry (not shown) from signal $V_1$ containing the transient and the video information to obtain a relatively clean signal containing solely the video information. The cancellation scheme, though per se well known, is especially useful in combination with the embodiments of this invention since the charge storage for one full line scan period enables the development of a signal of sufficient amplitude to make for easy processing of that signal.

It may also be appreciated that the circuit of FIG. 5 is akin to that of FIG. 3 with the first set of diodes simulating the function performed by the emitter-to-base junction of the video coupling transistor and the second set of diodes simulating the transient characteristics of the base-to-collector junctions of the video coupling transistor. However, it is noted that the diode circuit does not provide signal amplification such as is obtained with the transistor circuits. As in the circuit of FIG. 3, it should be appreciated that the negative level on the column causing the associated video coupling diodes to be reversed is only a quasi-stable state. That is, if the light is too bright, the potential on the column may rise above ground causing a continuous DC current to flow. Again, as in FIG. 3, the time constant of the video coupling capacitors (C12, C22, C32, C42) and the minimum photoconductive impedance must determine the maximum line scan period in order to prevent the DC condition from arising.

Diode couplers are important because they are easy to fabricate with closely spaced strips and are particularly compatible with sensor arrays containing diodes. The diode-capacitor circuit of FIG. 5 provides effective sequential switching for line storage. In addition, the video coupler provides dual output signals for effective cancellation of switching transients.

It has thus been shown in FIGS. 1 and 3 that bipolar transistors may be operated in a charge storage mode for storing the charge produced by elements of the array and, in FIG. 5 unidirectional elements have been used in combination with capacitors in a charge storage mode. In all three figures the scanning pulse is coupled between that terminal of the charge storage capacitor which is not connected to a column and the emitters of the transistor or the cathodes of the diodes. In the circuit of FIG. 1 the scanning pulse was used to raise or lower the potential at the emitter of the video coupling transistor while in FIG. 3 the scanning pulse was used to lower or raise the potential at the base of the video coupling transistors. In all three circuits it was shown that information generated by an array could be stored while the coupling elements were cut off and that the coupling elements could then be energized to read out the stored information and concurrently discharge the charge storage means (the capacitors) restoring the system to its original condition.

It should also be noted that the video couplers of FIGS. 1, 3 and 5 could be used in combination with any number of different types of decoders which further decreases the number of components.

What is claimed is:

1. In combination:

a first circuit point;

a circuit node;

a second circuit point;

transducing means connected between said second circuit point and said circuit node for supplying an output current to said node in response to an excitation signal;

charge storage means connected between said circuit node and said first circuit point for accumulating a charge in response to said output current produced by said transducer means;

signal voltage responsive means connected at its input terminal to said circuit node and having also an output terminal, for producing at said output terminal a signal of an amplitude proportional to the amount of accumulated charge;

sampling means directly connected to said first circuit point for normally placing the voltage at said first circuit point at a level sufficient to prevent conduction of said signal voltage responsive means in response to the maximum charge normally accumulated in said storage means and for subsequently placing the voltage level of said first circuit point at a level having a value sufficient to enable conduction through said voltage responsive means of the charge stored in said storage means; and means in said signal voltage responsive means for discharging said charge storage means when said voltage responsive means is enabled.

2. The combination as claimed in claim 1 wherein said voltage responsive means includes a diode having its anode connected to said charge storage means at said circuit node and its cathode connected to said output terminal, and including impedance means connecting said output terminal to a point of reference potential; and wherein said sampling means switches the potential at said circuit node from a high value of potential to a low value of potential for establishing a negative potential at the anode of said diode with respect to the potential at said point of reference potential whereby said diode is rendered non-conducting and then switches the potential from said low value of potential to said high value of potential in a direction to forward bias said diode and cause current to flow from said charge storage means to said output terminal.

3. The combination as claimed in claim 2 further including a second diode having its anode connected to the anode of said diode and its cathode connected to a second output terminal and further including biasing means applied at the cathode of said second diode for blocking signals of less than a given value from flowing through said second diode.

4. In the combination as claimed in claim 2 wherein the switching of said sampling pulses cause switching transient signals to be coupled through said diode and be mixed with the sensing element signal further including:

a second diode having its anode connected to the anode of said diode and its cathode connected to a second output terminal; and reverse biasing means applied at the cathode of said second diode of sufficient amplitude to block the passage of said sensing element signal but permit the passage of switching transient signals whereby the signals at said first and second output terminals may be subtracted to produce a virtually transient free output signal.

5. The combination as claimed in claim 1 wherein said voltage responsive means includes a transistor having its base connected to said charge storage means at said circuit node and its emitter connected to said output terminal and further including first impedance means connecting said output terminal to a point of reference potential and second impedance means connecting the collector of said transistor to a source of operating potential; and wherein said sampling means switches the potential at said other end of said charge storage means from a high value of potential to a low value of potential for establishing a negative potential at the base of said transistor with respect to the potential at its emitter whereby said transistor is rendered non-conductive, and then switches the potential from said low value to said high value to forward bias the base with respect to the emitter and cause signal current to flow into the base-to-emitter path and an amplified current to flow through the collector-to-emitter path of said transistor into said output terminal.

6. The combination as claimed in claim 1 wherein said sampling means is coupled between said first circuit point and a point of reference potential thereby providing a return path for said charge storing means; and wherein said signal responsive means includes impedance means connected between said output terminal and said point of reference potential.

7. In combination:

a sensing element for producing a current in response to an excitation signal;

a transistor having base, emitter and collector;

a charge storage means connected at one terminal both to the base of said transistor and to said sensor for accumulating charge and developing a signal potential in response to the excitation of said sensor;

two valued pulse generating sampling means coupled between the other terminal of said charge storage means and the emitter of said transistor for reverse biasing the emitter of said transistor with respect to its base when said pulse is at one of its two level conditions and for applying a forward bias to the emitter with respect to the base when said pulse is at its other level condition, said transistor of the type which when reverse biased has a very high input impedance whereby no current flows through it and the current from said sensing element charges said charge storage means and when forward biased has a low impedance whereby it conducts the charge on said charge storage means across its base-to-emitter path for producing an amplified current in its collector-to-emitter path and concurrently discharging said charge storage means.

8. The combination as claimed in claim 7 wherein said other terminal of said charge storage means is returned to a point of fixed reference potential and wherein said sampling means provides a return path between the emitter of said transistor and said point of fixed reference potential.

9. A matrix array of transducing elements arranged in rows and columns wherein an element is connected between each row and each column;

first scanning means directly connected to one of said rows and columns for sequentially sampling said one of said rows and columns;

a plurality of transistors each transistor having its base connected to a different one of the other one of said rows and columns and its collector connected in common with the collectors of the other transistors to an output terminal;

charge storage means associated with the other one of said rows and columns and connected at one end to a different one of said transistors;

second scanning means coupled between the other end of said charge storage means and the emitters of said plurality of transistors for sequentially sampling the emitters of said transistors, said second scanning means producing pulses having a first value for reverse biasing the base-to-emitter region of said transistors, whereby said transistors are rendered non-conductive and said charge storage means accumulate the charge produced by the elements connected to their associated columns and producing pulses having a second value for forward biasing the emitter-to-base region of said transistors for causing the charge stored in said charge storage means to be discharged through the base-to-emitter region of said transistor and for concurrently causing a corresponding amplified current to flow in the collector-to-emitter path of the transistor.

10. In combination with a matrix array of elements connected between two sets of intersecting conductors, a coupling circuit comprising:

a plurality of charge storage means, and a plurality of signal coupling means;

means coupling each one of said signal coupling means between one end of a different one of said charge storage means and an output terminal;

impedance means coupling said output terminal to a point of reference potential;

means coupling said one end of said charge storage means to a different one of the conductors of one set of said two sets of conductors; and sequencing means coupled between the other end of said charge storage means and said point of reference potential for sequentially sampling the contents of said storage means; said sequencing means applying pulses to said charge storage means for coupling therethrough negative and positive going voltage steps for under one condition rendering said signal coupling means non-conducting and causing the signal produced by the elements of said array to accumulate charge on their respective charge storage means and for under the other condition rendering said signal coupling means conducting for producing an output signal at said output terminal proportional to the stored charge and for concurrently discharging the charge storage means associated with the selected signal coupling means.

11. In combination:

transducer means for producing signal current in response to an excitation signal;

two parallel current paths connected between said transducer means and a point of reference potential, one of said paths comprising charge storage means and the other one of said paths including the base-to-emitter diode of a bipolar transistor poled to conduct the current from said transducer means in the forward direction;

sampling means connected between the emitter of said transistor and said storage means;

means responsive to a sampling signal transition from a first level to a second level for maintaining said base-to-emitter diode cut off and thereby causing said signal current, when present, to charge said charge storage means and responsive to a sampling signal transition from said second level to said first level for placing said base-to-emitter diode in a conducting condition, whereby said charge storage means, if charged to greater than a given value, discharges into said transistor; and an output circuit coupled to the collector of said bipolar transistor and responsive to current flow in the base-to-emitter diode, for producing an amplified output signal.

12. The combination as claimed in claim 11 further providing load means connected to the emitter and collector of said bipolar transistor for producing two output signals thereat one being out-of-phase with respect to the other.

13. The combination as claimed in claim 12 wherein said charge storage means is a capacitor.

14. The combination as claimed in claim 12 wherein said sampling means is coupled in series with said charge storage means between said transducer means and said point of reference potential.

* * * * *